Aug. 28, 1928. 1,682,277
F. B. HAYES
OIL SPRAY PURGE MECHANISM FOR WATER GAS APPARATUS
Filed Aug. 11, 1924 3 Sheets-Sheet 1

Inventor
Fred B. Hayes.

By Munday, Clarke & Carpenter
Attorneys

Aug. 28, 1928.
F. B. HAYES
1,682,277
OIL SPRAY PURGE MECHANISM FOR WATER GAS APPARATUS
Filed Aug. 11, 1924   3 Sheets-Sheet 2
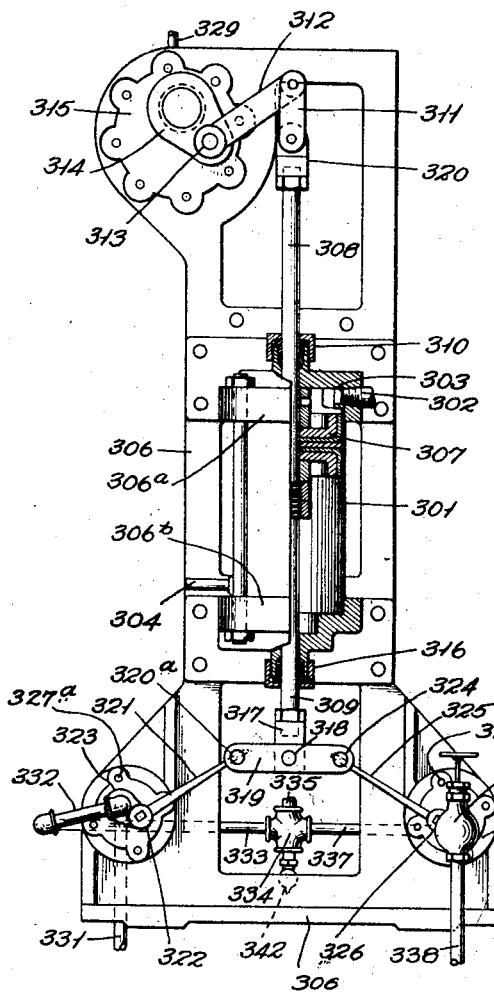
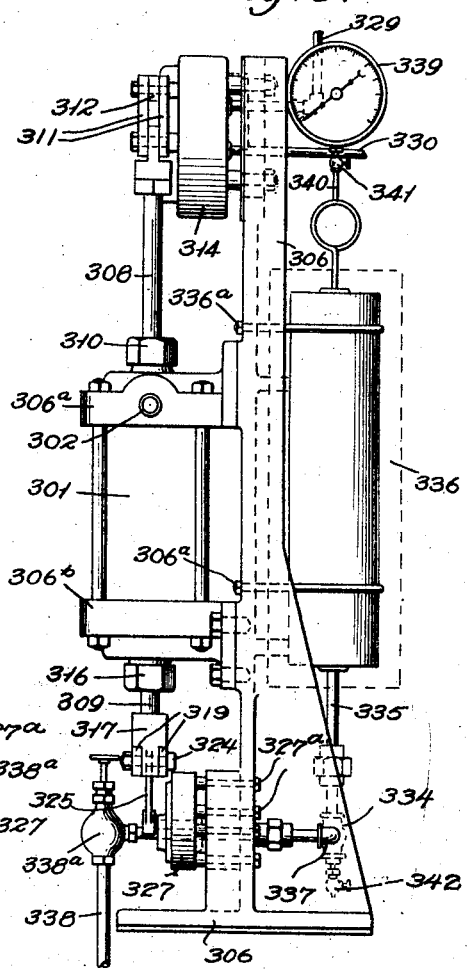
Inventor
Fred B. Hayes.
By Munday, Clarke & Carpenter
Attorneys

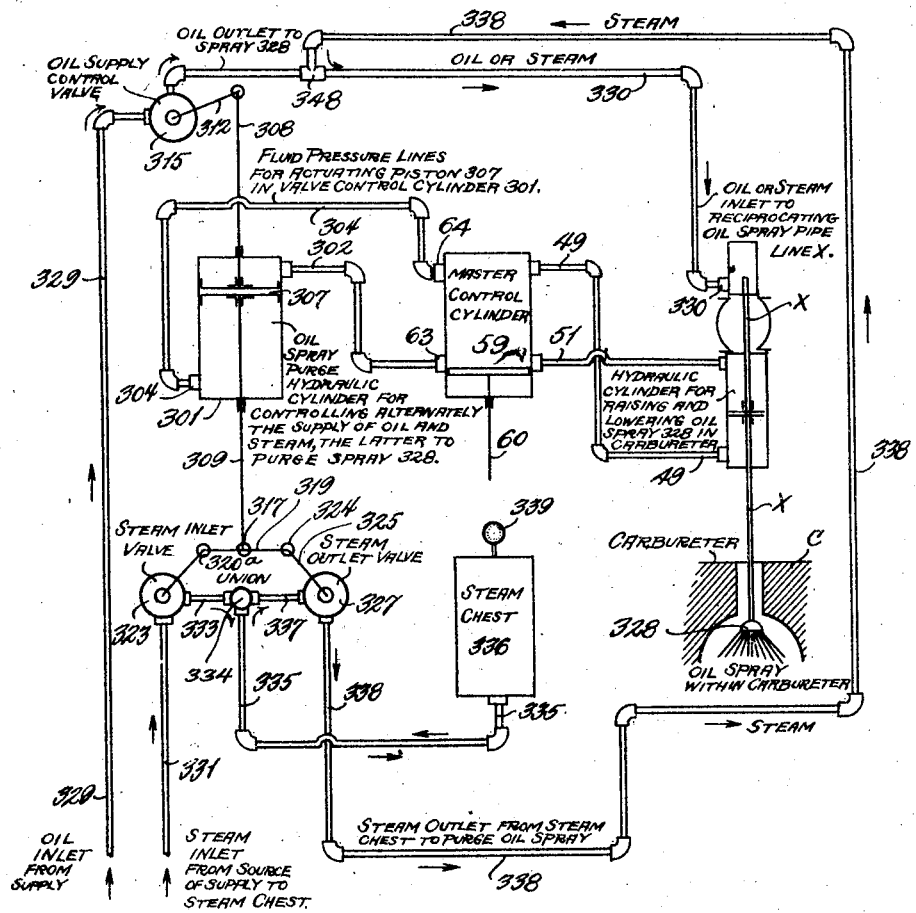

Patented Aug. 28, 1928.

1,682,277

UNITED STATES PATENT OFFICE.

FRED B. HAYES, OF FORT WAYNE, INDIANA, ASSIGNOR TO WESTERN GAS CONSTRUCTION COMPANY, OF FORT WAYNE, INDIANA, A CORPORATION OF INDIANA.

OIL-SPRAY PURGE MECHANISM FOR WATER-GAS APPARATUS.

Application filed August 11, 1924. Serial No. 731,426.

This invention relates to gas making apparatus, such as water gas sets; the invention has for an object to provide an efficient mechanism for automatically purging out the carbureter oil pipe line and oil spray, after the supply of oil to the carbureter has been shut off.

During the run or gas making period in the cycle of operation of a water gas set, oil is sprayed into the carbureter for the purpose of enriching the blue water gas which passes over into the carbureter from the generator. This is accomplished by lowering the oil spray into the carbureter and opening the valve in the oil line leading to the spray. The valve in the oil line is opened and closed at the proper times to admit the required amount of oil at a predetermined rate of flow. After passing through the valve, the oil is carried by the oil pipe line to the spray head, where the oil is atomized into and mixed with the blue-water gas that comes over from the generator. After the oil flow has been cut off by closing the valve in the oil pipe line, the pipe line and oil spray head would remain full of oil, unless proper provision is made for removing it. It is most disadvantageous to allow the oil to remain in the pipe line and spray head after the oil valve has been closed, for the reason that the oil standing in the spray head is apt to undergo distillation and carbonization near the spray ports and cause them gradually to plug up. Furthermore, during the air blasting period the heat is apt to cause the oil remaining in the spray head and some of it in the oil line to be vaporized, and thus driven off with the blast and burned and wasted. In order to prevent this, it has heretofore been a common practice for an attendant to open a manual steam valve, after the oil valve has been closed, and permit steam to enter the oil line between the spray head and the oil cut-off valve and to blow the oil out of this portion of the line and through the spray head.

In a hand operated water gas set, this is usually accomplished by providing an auxiliary hand operated steam valve, the steam line from which enters the oil line at the discharge side of the main oil cut off valve. On closing the main cut-off valve to cut off the flow of oil into the carbureter, the operator may purge the oil line and the spray head by hand by simply opening and quickly closing the steam valve, so that enough steam is admitted to blow all of the oil out of the oil line and spray head into the carbureter while the water gas run is still on. This remaining oil is vaporized in the carbureter and made use of in the good gas that is passing through the carbureter at the termination of the steam run period of the cycle.

The above described hand purging of the oil line and spray head involves two operations, one, opening and closing the main oil cut-off valve, and the other, opening and closing the hand steam purge valve. In the more modern gas apparatus provided with centralized controlling systems, whether operated manually from a water table or control station, as disclosed in patent to Thomas W. Stone, No. 1,353,977, for valve control mechanism, dated September 28, 1920, or operated automatically as disclosed in an application of Thomas W. Stone for gas making apparatus, filed August 5, 1921, Serial No. 490,088, the prior application of Thomas W. Stone and Walter Barr, for valve controlling apparatus, filed January 31, 1923, Serial No. 616,139, and the prior application of Walter Barr, for water gas machine valve controlling apparatus, filed January 31, 1923, Serial No. 616,162, it is expensive, complicated and quite inconvenient to carry two sets of pressure lines from the main oil cut-off valve and the steam purge valve over to the centralized control station.

According to the present invention, automatic purging of the oil line and spray head is accomplished with the use of a single pair of lines to the central operating station, for example, the operating cylinder, said lines being, as in all the other cases, of hydraulically operated valves, alternately high pressure and discharge lines. The employment of a single pair of lines for controlling both the flow of oil to the carbureter and the purging after the oil is shut off is particularly advantageous for the reason that the time of shutting off the oil always occurs at the same relative moment in the operating cycle. On the other hand the period during which the oil is admitted to the carbureter varies a great deal, this depending on the heating value of the gas that is required, the quality of the oil used, and the length of the operating cycle. For example, in an operating cycle where the run is three minutes long, it might be desirable to vary the period during which the oil is admitted to the carbureter anywhere from one-half to two and a quarter minutes. This requires a variable control over the time of opening the main oil cut-off valve. It might be desirable to have the oil start flowing into the carbureter at any time from immediately after up to one minute after the stack valve closes, and also to shut off the oil at any time from one and a half minutes to half a minute before the stack valve opens. In all of these variable operating conditions, however, it is important that the steam purge valve be opened just after the closing of the main oil cut-off valve. The present invention accomplishes this result satisfactorily and requires only one pair of fluid pressure lines leading from the central control station to the point in the system where the oil flow and the steam purging operations are controlled.

In addition to the general objects recited above, the invention has for further objects such other improvements and advantages in construction and operation as are found to obtain in the structures and devices hereinafter described or claimed.

In the accompanying drawings forming a part of this specification and showing, for purposes of exemplification, a preferred form and manner in which the invention may be embodied and practiced, but without limiting the claimed invention to such illustrative instance or instances:

Fig. 2 is a front elevation partially in vertical section, of an oil spray purging device constructed in accordance with a preferred embodiment of the invention and which is designed to be connected by a single pair of alternately operating high pressure and discharge lines, with the central operating system illustrated in Fig. 1.

Fig. 3 is a side view of the device.

Fig. 4 is a diagrammatic view showing the automatic oil spray purge mechanism and its manner of connection to the central control cylinder and also showing the various oil and steam pipe lines connecting the automatic purging devices with the oil spray in the carbureter of a water gas set.

The same characters of reference designate the same parts in each of the several views of the drawings.

Figure 1:
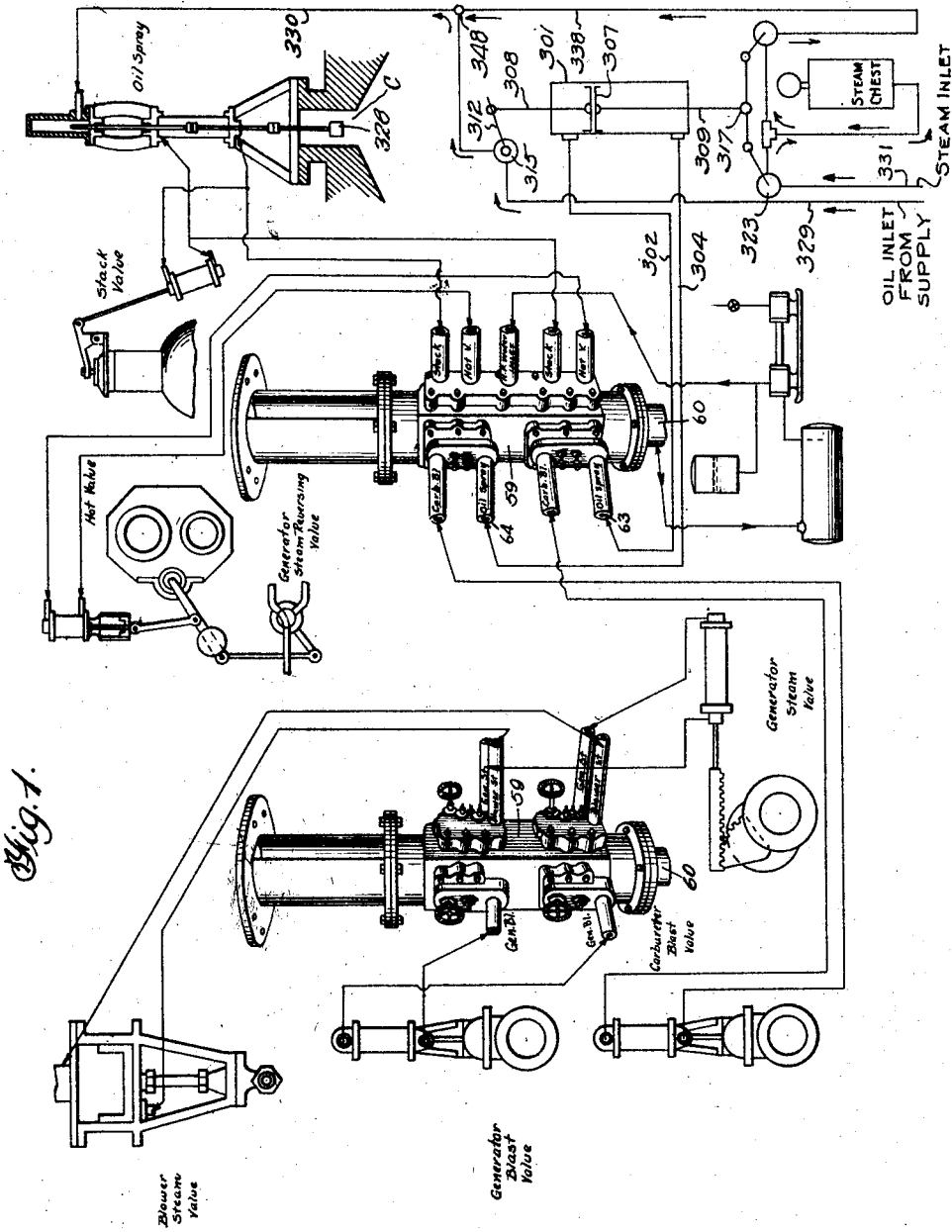
Figure 1 is a diagrammatic view showing the inclusion of the automatic oil spray purge mechanism of the invention within a centralized hydraulic control system for the various apparatus valves of a water gas set.

For convenience, the invention is illustrated according to one embodiment, as applied to an automatic valve operating mechanism, such as is disclosed in the prior application of Thomas W. Stone and Walter Barr, Serial No. 616,139 and the prior application of Walter Barr, Serial No. 616,162, hereinabove mentioned, in which all the apparatus valves of a water gas set are operated from a piston valve operating in a master cylinder. The invention, however, is capable of other useful applications and is not confined in scope to the specific embodiment herein described as an illustrative example.

Referring more particularly to Fig. 1 of the drawing, there is shown such a control system. There is provided in this system a vertical cylinder 59 which functions as a central power station from which hydraulic pressure is released through the several fluid pressure line connections from a source of fluid pressure supply, to operate the several valves in proper sequence during each cycle of operation of the water gas machine. As shown in Fig. 1, a discharge pipe 60 communicates with the bottom of the cylinder 59 and received the discharged fluid from the hydraulic pressure pipe lines to be hereinafter described. A fluid pressure line 302 to the top of the oil spray purge valve cylinder 301 leads from and is communicably connected with the bottom of the control cylinder 59, as shown at 63 (Fig. 4). A fluid pressure line 304 to the lower portion of said oil spray valve cylinder 301 leads from and is communicably connected with the top of the control cylinder 59, as shown at 64.

It will be apparent from the drawings that when the central piston in cylinder 59 is floated upwardly high pressure fluid leaves the cylinder through port 64 and enters the bottom of oil and steam valve control cylinder 301 thereby forcing the piston of said cylinder upwardly to automatically perform functions hereinafter described. When the piston in the central cylinder 59 is floated downwardly a reverse movement of the high pressure fluid takes place, said fluid leaving central cylinder 59 through port 63 and entering the top of oil control cylinder 301 to force the piston of the latter cylinder downwardly, also for purposes to be hereinafter described.

It will be understood that the central master control cylinder 59 is also provided with various additional ports and fluid pressure lines which operate in synchronized sequence the various valves of the water gas set in timed relation incident to the automatic performance of succeeding blast and gas making cycles. These additional valves controlled from the central cylinder 59 form no part of the present invention and will not be further described herein. For a complete understanding of the same reference is made to copending application Serial No. 616,139. The piston in cylinder 301 is floated upwardly by fluid pressure exerted from central control cylinder 59 when it is desired to admit oil into the carbureter for the purpose of enriching gas at the commencement of a gas making run. Similarly when piston in cylinder 301 moves downwardly this movement is also controlled from central cylinder 59 and the downward movement of the piston shuts off the oil to the carbureter toward the conclusion of the gas making run and immediately prior to the blasting period. As an incident to this movement the present invention includes automatic purging devices for storing a supply of steam when the piston in cylinder 301 is moved upwardly to admit oil to the carbureter, said automatic devices being further operative to release this stored steam for the purpose of purging the oil remaining in the spray line and nozzle when the piston and cylinder 301 move downwardly to cut off the oil supply toward the conclusion of the gas making run.

Referring now more particularly to Figs. 1 and 2, the oil spray purge mechanism includes a main operating cylinder 301 to the top of which the hydraulic fluid pressure line 302 from the oil spray port 63 in the central cylinder 59 communicates through a threaded aperture 303. The fluid pressure line 304 from the oil spray port 64 in the central cylinder 59 communicates with the lower portion of the cylinder 301. The oil spray purge cylinder 301 is suitably secured to an upright frame 306 by means of brackets 306ª and 306ᵇ bolted to said frame. The frame 306 may form a part of or be attached to a suitable portion of the gas making set, and the cylinder 301 is provided with a single reciprocating double faced piston 307, having centrally threaded or otherwise suitably secured thereto vertically reciprocating upper and lower piston rods 308 and 309. The upper piston rod 308 passes through a stuffing box 310 on the upper end of the cylinder and is threaded at its upper end within an upper crosshead 320 which latter is pivoted between a pair of links 311. The upper ends of the links 311 are pivotally connected to one end of a lever 312 (Figs. 2 and 3), the other end of which latter is pivotally connected as at 313 to the arm 314 of an oil supply valve contained within a valve casing 315 secured to the frame 306. The lower piston rod 309 passes through a stuffing box 316 secured to the lower cylinder head and is threaded at its lower end to a lower crosshead 317 which latter is secured as at 318 to a pair of transverse connected links 319. One end of the links 319 has a pivotal and sliding connection 320ª with a lever 321 pivotally connected at its lower end as at 322 with a steam inlet valve contained within the valve casing 323, suitably secured to the frame 306 as by bolts 327ª. The opposite ends of the links 319 have a similar pivotal and sliding connection 324 with a lever 325, the lower end of which lever is pivoted as at 326 to a steam outlet valve contained within the valve casing 327 secured to the frame 306.

Oil is admitted to the valve casing 315 through an oil supply pipe 329, leading from any desired source, and from the valve the oil is connected through an oil outlet pipe 330 to the oil spray and nozzle 328 in the top of the carburetor C (Fig. 4).

Steam is admitted from a suitable source to the interior of the valve casing 323 through a steam inlet pipe 331, the supply of steam to the valve casing being controlled by needle or other suitabe valve (not shown). From the valve casing 323 and on the opposite side of the valve contained therein, the steam is conducted by means of a pipe 332, communicating with a pipe 333 to a union 334. From the latter the steam is conducted by a vertical pipe 335 into the lower end of a steam chest 336 secured as by bolts 336ª to the frame 306 on the opposite side of the high pressure cylinder 301. A steam pipe 337, similar to the pipe 333, communicates at one end with the union 334 and communicates at its other end to within the steam outlet valve casing 327. A steam outlet pipe 338, having a suitable needle control valve 338ª, leads from the valve casing 327 at the other side of the valve and is designed to conduct the steam from the chest 336 to a suitable point of connection 348 (Fig. 1) with the oil spray outlet pipe 330, which latter as above described leads to the oil spray and nozzle 328 in the top of the carburetor C. A steam gauge 339 is mounted on the upper end of the steam chest 336; communicates therewith by means of a pipe 340, and is controlled by a valve 341. The gauge 339 indicates the pressure of steam within the steam chest 336. A suitable exhaust or drain cock 342 is provided on the lower side of the union 334.

The operation of the oil purge cylinder and connected valves and devices hereinbefore described is as follows:

At the proper interval, determined preferably by the central pressure cylinder 59, fluid is admitted to the cylinder 301 through the high pressure line 304, and expands in said cylinder against the lower face of the piston 307, forcing the same upwardly. The resulting upward movement of the upper piston rod 308 operates through the links 311 and lever 312 to open the oil supply valve contained within the valve casing 315. Oil is thereby permitted to flow from the pipe 329 through the valve and is directed by the pipe 330 to the oil spray and nozzle in the top of the carbureter C (Fig. 1). Simultaneously the lower piston rod 309 moves upwardly carrying therewith the lower cross head 317 and links 319. The pivotal and sliding connection 320 with the lever 321 causes the steam inlet valve within the casing 323 to be opened, admitting steam from the inlet pipe 331 through the valve into the pipes 332 and 333, and thence through the pipe 335 into the steam chest 336. This upward movement described of the lower piston rod 309 serves through the pivotal and sliding connection 324 and lever 325 to close the steam outlet valve contained within the casing 327, and thereby prevents the escape of steam which enters the steam chest 336 where the pressure soon equals the pressure in the boiler or steam supply line 331. The piston 307 and piston rods 308 and 309 remain in their uppermost position as shown in Fig. 2 until the expiration of a predetermined time, or approximately for the duration of the gas making period and oil continues to flow through the oil valve within the casing 315 to the spray and nozzle 328 in the upper part of the carbureter C. Prior to the expiration of the gas making period and at a certain interval determined by the central cylinder 59, the high pressure fluid lines 302 and 304 are reversed and the fluid is now admitted through the pipe 302 into the cylinder above the piston head 307. The pipe 304 now becomes the fluid discharge pipe and the downward movement of the upper piston rod 308 through the links and levers described closes the oil inlet valve contained within the casing 315, thereby shutting off the supply of oil to the spray 328 in the carbureter C. Simultaneously the downward movement of the lower piston rod 309 through the sliding pivotal connections 320 and 324 and levers 321 and 325, operate to close the steam inlet valve contained within the casing 323 and to open the steam outlet valve contained within the casing 327. The admission of steam to the steam chest is thereby shut off and the opening of the steam outlet valve 327 permits the steam stored up in the chest 336 to escape through the pipes 335, 337 and 338 into the oil outlet pipe 330 to purge the latter and the spray and nozzle 328 of any oil remaining in the same after the oil supply valve has been closed. The amount of steam contained within the chest 336 is sufficient to completely purge or clean the oil residue from the pipe leading to the spray as well as any oil contained within the spray nozzle. The piston 307 remains in its lowermost position until it is desired to again open the oil supply valve for a succeeding gas making period. At this time the piston 307 is once more caused to move upwardly by reversing the flow of fluid through the high pressure lines 302 and 304 from the central control cylinder 59, and the respective mechanisms again operate as hereinabove described on the upward movement of the piston 307.

By the devices described there is provided a compact, efficient and positively operating mechanism for forcing all the oil trapped in the spray 328 and pipe line 330 into the carbureter at the time the gas run is on with the result that the oil so ejected is caused to enter the carbureter and combine with the gas being made, and the heating value of this oil is thereby retained for the enriching of the gas being manufactured.

What is claimed is:

1. An automatic oil spray purge mechanism for the carbureter of a water gas set, comprising in combination: pressure responsive means operative in one direction to admit oil to the oil spray and admit steam to a storage receptacle, said pressure responsive means being operative in the opposite direction to cut off the supply of oil to said spray and the supply of steam to said storage receptacle, and to release the stored steam and admit the same to said oil spray to purge the latter of oil accumulations after the oil supply has been shut off, and automatic means for actuating said pressure responsive means.

2. An automatic oil spray purge mechanism for gas making apparatus, comprising in combination: an oil spray, means for supplying oil to said spray, a valve for controlling said oil supply means, a steam chest, means for supplying steam to said steam chest, a valve for controlling said steam supply means, means for supplying steam from said steam chest to said oil spray, and having a control valve, a fluid pressure means operatively connected to said oil valve and said steam valves and adapted when in one position to permit the flow of oil to said oil spray and the flow of steam to said steam chest, said fluid pressure means being operative in another position to cut off the flow of oil to said spray and the flow of steam to said steam chest, and permit the flow of steam from said steam chest to said oil spray.

3. An automatic oil spray purge mechanism for gas making apparatus, comprising in combination: an oil spray, a valve controlled pipe line for supplying oil to said spray, a steam chest, a valve controlled pipe line for supplying steam to said steam chest, a valve controlled pipe line for admitting steam from said chest to said oil supply line, and a fluid pressure piston automatically operative in one position to permit the flow of oil to said oil spray and the flow of steam to said steam chest, said fluid pressure piston being automatically operative in another direction to cut off the flow of oil to said spray and the flow of steam to said steam chest, and admit said flow of steam from said steam chest to said oil spray.

4. An automatic oil spray purge mechanism for gas making apparatus, comprising in combination: a spray head, valve controlled means for supplying oil to said spray head, a steam chest, valve controlled means for supplying steam to said steam chest, valve controlled means for supplying steam from said steam chest to said spray head, fluid pressure means operatively connected to the valves of said valve controlled means and operating in one direction to permit the flow of oil to said spray head and the flow of steam to said steam chest, said fluid pressure means operating in the opposite direction to cut off the flow of oil to said spray head and the flow of steam to said steam chest, and permit the flow of steam from said steam chest to said spray head, and automatically operated hydraulic means synchronized with said valves for periodically supplying fluid pressure to said fluid pressure means.

5. An automatic oil spray purge mechanism for gas making apparatus, comprising in combination: an oil spray, means for supplying oil to said spray, means for supplying steam to said spray, and automatic means for controlling the supply of oil to said spray, said means being further operative to control the supply of steam to said spray.

6. An automatic oil spray purge mechanism for gas making apparatus, comprising in combination: a spray head, an oil supply line for supplying oil to said spray head, means for supplying steam to said oil supply line and said spray head, fluid pressure means for controlling the supply of oil to said spray head, said fluid pressure means being further operative to control the supply of steam to said oil supply line and said spray head, and an automatically actuated fluid pressure cylinder for periodically supplying fluid pressure to said fluid pressure means, whereby said oil supply line and said spray head are purged of oil when the supply of oil thereto has been cut off.

7. An automatic oil spray purge mechanism for gas making apparatus comprising in combination: an oil spray, means for supplying oil to said spray, a valve for controlling said oil supply, means for supplying steam to said oil supplying means and said spray between the latter and said oil valve, valves for controlling said steam supply, and fluid pressure means automatically operative in one direction to permit the flow of oil and prevent the admission of steam to said spray, said means being automatically operative in another direction to cut off the flow of oil and permit the flow of steam to said oil spray.

In witness whereof I have hereunto set my hand.

FRED B. HAYES.